UNITED STATES PATENT OFFICE.

GILBERT DÉCLAT, OF PARIS, FRANCE.

MEDICINAL PREPARATION.

SPECIFICATION forming part of Letters Patent No. 265,583, dated October 10, 1882.

Application filed November 29, 1881. (Specimens.)

*To all whom it may concern:*

Be it known that I, GILBERT DÉCLAT, of Paris, France, have invented a new and Improved Antiseptic Compound, of which the following is a full, clear, and exact description.

This invention relates to a new composition of matter, or preparation of iodine and phenic or carbolic acid.

Heretofore phenic or carbolic acid has been added to the tincture of iodine in order to avoid discoloration of the skin, the said tincture being expressly prepared for external use or for injection into the cavities of the body. Such carbolated tincture had, however, no new therapeutic object or effect, the sole purpose of adding carbolic acid being to enable the tincture to be used without coloring the skin. For this purpose a few drops only of the carbolic acid have been used.

The new preparation, to which is given the name "iodo-phenique," is of an entirely different character, the phenic or carbolic acid being an active remedial agent and the preparation or compound being adapted to hypodermic or subcutaneous injection. It is characterized by the admixture of iodine in the native or uncombined state, and not in the form of a tincture, and the use of carbolic acid in large proportion.

The new preparation can without danger to health be introduced under the skin, so as to come into contact with the blood, where it can exert its full anti-fermentative action—an action not attainable with any other known medicament, not even with iodine, which cannot be introduced under the skin, nor with phenic or carbolic acid, which has not the same properties or operation.

The composition will dissipate the epithelium cancer, it will stop the growth of tumors, and has other beneficial effects. Its action is upon the germs or ferments which have been found to be the causes of the diseases mentioned and of many others. The materials and proportions employed are as follows: iodine, five one-thousandths to one part; phenic or carbolic acid, one to five parts; water, or other suitable solvent—say a solution of iodide of potassium containing one-tenth to two parts of the salt—enough to make one hundred parts. The iodine, when combined with carbolic acid in the above proportions, loses all color.

I will now explain why I have combined carbolic acid and iodine in my antiseptic compound. As is well known, there are antiseptics of two kinds.

First. The antiseptics having a strong affinity for oxygen—such as sulphites, sulphurous acid, sulphides, selenides, selenites, alkaline phenates, carbolic acid, arsenious acid, arsenites, mercury, calomel, tannin, carbolic oxide, volatile and essential oils, and fixed oils—and to this class I have given the name of "antiseptic reducers."

Second. The antiseptics which, on the contrary, produce or furnish (liberate) oxygen, either free or combined, to which class I have given the name of "antiseptic oxidants." Examples of these are: chlorine, bromine, iodine, perchloride of iron, periodide of iron, alkaline hypochlorites, bromates, iodates, vanadates, &c.

There are two kinds of ferments that produce diseases, of which one kind lives on oxygen, whereas the other is destroyed by oxygen.

Antiseptics are either reducers or oxidants. Carbolic acid, which is really an alcohol, does not lose its properties as an antiseptic reducer, even in presence of antiseptic oxidants, and it is thus evident that the mixture of iodine and carbolic acid will act on ferments that live on oxygen as well as on ferments that are destroyed by oxygen.

I have found that metallic iodine is to be used with greater advantage in this compound than any other, and in this combination it can be injected hypodermically, not only without injury, but with decided and positive benefit.

Having now fully described my said invention and the manner of carrying the same into effect, I would observe, in conclusion, that I do not claim herein, broadly, the combination of iodine and carbolic acid, although of my own invention and used by me since 1865; but as I have for the purposes indicated found certain proportions to be most advantageous and useful, I claim—

The composition or preparation of iodine and carbolic acid compounded as and in the proportions set forth.

GILBERT DÉCLAT.

Witnesses:
C. NEVENS,
O. F. GUNZ.